United States Patent

Al Ghatta et al.

[11] Patent Number: 6,013,360
[45] Date of Patent: Jan. 11, 2000

[54] BLOWN POLYESTER FILM

[75] Inventors: Hussain Al Ghatta, Fiuggi; Sandro Cobror, Pozzilli, both of Italy

[73] Assignee: Sinco Engineering, S.p.A., Italy

[21] Appl. No.: 08/892,209

[22] Filed: Jul. 14, 1997

[30] Foreign Application Priority Data

Jul. 15, 1996 [IT] Italy .................................. MI96A1461

[51] Int. Cl.⁷ .................................................. B32B 27/36
[52] U.S. Cl. ........................ 428/220; 428/480; 428/474.4; 428/910
[58] Field of Search ..................................... 428/480, 336, 428/220, 412, 474.4, 910

[56] References Cited

U.S. PATENT DOCUMENTS

| | | | |
|---|---|---|---|
| 4,145,466 | 3/1979 | Leslie et al. | 428/36.92 |
| 4,837,115 | 6/1989 | Igarashi et al. | 428/36.92 |
| 5,043,400 | 8/1991 | Tsuruta et al. | 525/437 |
| 5,776,994 | 7/1998 | Al Ghatta et al. | 521/182 |
| 5,801,206 | 9/1998 | Khemani et al. | 521/81 |

FOREIGN PATENT DOCUMENTS

| | | |
|---|---|---|
| 97111970 | 12/1997 | European Pat. Off. . |
| 04345628 | 12/1992 | Japan . |
| 93-226383 | 2/1995 | Japan . |
| WO 93/08226 | 4/1993 | WIPO . |
| WO 94/26821 | 11/1994 | WIPO . |

OTHER PUBLICATIONS

Alger, Polymer Science Dictionary, Chapman & Hall, p. 292, 1989.

Blends of Polycarbonate with Polyester, Research Disclosure Nov. 1993.

*Primary Examiner*—D. S. Nakarani
*Assistant Examiner*—Ramsey Zacharia
*Attorney, Agent, or Firm*—Cook, Alex, McFarron, Manzo, Cummings & Mehler, Ltd.

[57] ABSTRACT

Film obtained by blowing, using the bubble method from aromatic polyester resins containing a dianhydride of an aromatic tetracarboxylic acid, having thickness inferior to 10 μm.

17 Claims, No Drawings

BLOWN POLYESTER FILM

The present invention refers to low thickness film blown from aromatic polyester resins and their preparation method. Thanks to their high mechanical properties, aromatic polyester resins are suitable for use in the preparation of films which can be applied in various sectors, basically in the food packaging, photographic film and electrical insulation fields.

The prevailingly used films are mono and bi-oriented. The films are generally prepared using the "cast" technique. Preparation by blowing using the bubble method encounter difficulties because of the low melt strength of the polyester resin.

The thickness of the cast film is generally between 10 and 100 $\mu$m.

In U.S. Pat. No. 4,145,466 it was proposed to increase the melt strength of the polyester resins by incorporating in the same small percentages of dianhydrides of aromatic tetracarboxylic acids (pyromellitic anhydride is the preferred compound). The resins thus modified are used for the preparation of bottles by blow moulding and of films using the bubble filming technique.

The thickness of the film obtained is however above 10 $\mu$m.

The preparation is carried out by blowing using the single bubble method and starting with PET mixed with pyromellitic dianhydride in the extruder and then directly subjected to filming.

The preparation of film with thickness below 10 $\mu$m from polyester resins added with pyromellitic anhydride is difficult to accomplish due to the instability of the bubble and its tendency to burst.

The possibility of obtaining film of thickness below 10 $\mu$m, using the bubble blowing method is very interesting in that it would allow high quality film to be obtained and at the same time give a reduction in costs in respect to film obtained using the cast method.

It has now been unexpectedly found that it is possible to prepare film of thickness below 10 $\mu$m by blowing using the single bubble or double bubble method from resins with melt strength of at least 3–4 cN uniformly distributed in the mass of melt resin to be subjected to blowing.

The melt strength is generally between 3–15 cN (at 290° C.).

The uniform values of the melt strength are obtained by mixing the resin melt with a dianhydride of an aromatic tetracarboxylic acid, extruding and pelletizing the resin and re-extruding it then for the filming process.

It is also possible to obtain a uniform distribution of the dianhydride by using sufficiently long residence times in the extruder and such as to ensure achievement of desired melt strength. Residence times are between 5–10 minutes. Pyromellitic dianhydride is the preferred compound and is employed in quantities from 0.01 to 2% by weight.

Other dianhydrides which can be used are the dianhydrides of 3,3'-4,4-diphenyl, tetracarboxylic acid, 3,3'-4, 4benzophenoxy-tetracarboxylic bis- (3,4-dicarboxyphenyl) ether, bis- (3,4-dicarboxyphenyl) sulphone.

The films obtained by blowing using the single bubble method are not oriented.

These films can have useful applications for example in the food packaging field.

The biaxially stretched films are obtained by double bubble blowing in which the first bubble is further blown at a temperature higher than the Tg of the resin.

The bi-oriented films possess notable mechanical and barrier properties which are considerably superior to those of non-oriented films.

It has been found, and this consists in a further aspect of the invention, that films obtained from polyester resins added with a dianhydride of an aromatic tetracarboxylic acid and with liquid crystals (LCP) in quantities inferior to 5% by weight and/or with a polyamide in quantity between 1 and 20% by weight, present oxygen barrier properties superior to those of films obtained with resins added solely with the dianhydride.

It has also been found that thin films with high mechanical properties can be obtained also from resins added with a dianhydride of a tetracarboxylic acid, in which the dianhydride is supplied in concentrate form with a polycarbonate resin. The concentrates generally contain a quantity of dianhydride inferior to 20% in weight.

Particularly interesting results are obtained also with ethylene terephthalic copolymers in which up to 15% units deriving from terephthalic acid are substituted by units deriving from isophthalic acid and 2,6-naphthalene-dicarboxylic acid where the ratio of the units deriving from isophthalic acid and naphthalene-dicarboxylic acids is from 1:3 to 3:1.

Aromatic polyester resins utilizable for the preparation of film of the invention are formed of products of polycondensation of an aromatic dicarboxylic acid or of an alkyl diester thereof, in particular the dimethyl diester, with an aliphatic glycol with 2–12 carbon atoms, in particular ethylene glycol, 1,4-butandiol and 1,4 dimethylolcyclohexane.

The polycondensation, and the transesterification reaction when starting from dimethyl esters is carried out according to known methods.

Resins particularly suitable for the preparation of bioriented film to be used for the internal layer of drink cans are obtained from polyethylene terephthalate with recurring units deriving from at least 85% in moles from ethylene glycol and for 30–10% in moles from diethylene glycol and in which total of recurring units deriving from ethylene glycol and diethylene glycol is at least 90% in moles.

Films particularly suitable are obtained from resins in which the recurring units deriving from diethylene glycol are between 15 and 25% by moles.

The polyester resins used for the preparation of the films have an intrinsic viscosity generally between 0.5 and 0.8 dl/g.

The preparation of film by single or double bubble blowing is carried out according to known methods.

The polymer is extruded and passed to a blowing head in general set vertically to the extrusion direction, from which a tubular product is obtained blown by air.

The air is trapped in the bubble between the extrusion head at one end and the collecting line at the other end. As the melt exits from the extrusion head and starts to cool, the tube is expanded several times its diameter and flattened to form a flat tubular film which is then collected on tubular bobbins or cut.

The tubular product at the extruder exit is cooled under a stream of cold blown air.

The temperature of the air and the contact point on the external surface of the bubble are varied according to the desired film properties.

The speed of extrusion head is kept as low as possible in order to allow the formation of the bubble (1 kg/h under the conditions illustrated in the examples) and the pressure of the blown air is regulated so as to obtain maximum expansion permitted for the bubble (from approx. 6 to 9 times the diameter of the extrusion ring aperture).

In the case of double bubble blowing, the first bubble is further blown at a temperature superior to the Tg of the resin.

Measurements and Analytic Properties

The measurement of intrinsic viscosity is carried out by dissolving 0.5 g of resin in 100 ml of a mixture 60/40 by weight of phenol and tetrachloroethane at 25° C. operating according to ASTM 4063-8G.

The measurement of the melt strength is carried out at 290° C. in a Goettfert rheometer equipped with a 2 mm diameter capillary, extruding a filament with piston speed of 0.2 mm/s.

The filament is collected between cog wheels to which acceleration of peripheric speed of 60 mm/s$^2$ is applied. The tension applied is the force that the filament applies to the wheels at maximum speed (1000 mm/s).

The measurement is carried out according to ASTM D 4440.

The following examples are provided to illustrate but not to limit the invention.

EXAMPLE 1

10 kg/h of a mixture of crystalline PET in granules (IV 0.6 dl/g) and pyromellitic dianhydride PMDA (0.3% by weight) is fed continuously, after drying at 140° C. under vacuum for 10h, to a twin screw counter-rotating intermeshing extruder operating under the following conditions:

| | |
|---|---|
| Screw speed: | 150 rpm |
| Cylinder temperature: | 170° C. |
| Granule feeding: | 10 kg/h |
| Type of mould: | circular - 3 mm diameter |
| PMDA feeding: | 0.03 kg/h |
| Residence time in the extruder: | 1 min |
| IV of the extruded product | 0.607 dl/g |
| Melt strength of the extrudate: | 3.5–4 cN |

The obtained granules or polymer was then extruded to produce blown film using a Brabender single screw extruder operating at 280° C. and equipped with a ring mould 3 cm in diameter and Haake blowing head.

Rate at blowing head was 1 kg/h.

Residence time in the Brabender extruder was 1.5 min. The tubular product at blowing head exit was blown with air at room temperature.

Cooling air was passed over the bubble surface at temperature of 23° C.

Air pressure of blowing was regulated so as to obtain maximum expansion of bubble (20–25 cm in diameter).

The speed of film collection was 3 $\mu$m and the IV of the film 0.65 dl/g.

The barrier properties of the blown film such as $CO_2$ permeability (ml/day/cm$^2$) was 750.

EXAMPLE 2

The preparation of Example 1 was repeated with the only difference being that the following mixture was used: 95% in weight of PET, 4.4% in weight of liquid crystal Vectra A 950 (from Hoechst Celanese) which is a poly(oxybenzoyl-co-oxnaphtoyl) copolymer in which the ratio between the oxybenzoyl and oxynaprntoyl units is 7:3 and 0.3% in weight of PMDA.

The film thickness obtained was 4 $\mu$m.

Permeability to $CO_2$ was 550 ml/day/m$^2$.

EXAMPLE 3

The preparation of Example 1 was repeated with the only difference being that a mixture of 95% in weight of PET, 4.5% in weight of Nylon 6 and 0.3% in weight of PMDA were used.

The film thickness was 2.5–3 $\mu$m.

The permeability to $CO_2$ was 450 ml/day/m$^2$.

The measurement of $CO_2$ permeability was carried out by employing a Mocon Permatron equipment operating at 23° C.

What is claimed is:

1. Film from aromatic polyester resins containing a dianhydride of an aromatic tetracarboxylic acid, said film begin obtained by the bubble blowing method, and having a thickness from at least 2.5 $\mu$m to less than 10 $\mu$m.

2. Film according to claim 1 wherein the resin is selected from the group consisting of polyethylene terephthalate, polybutylene terephthalate, and ethyleneterephthalate copolymers in which up to 15% in moles of ethyleneterephthalate units are substituted by units deriving from aromatic dicarboxylic acids selected from the group consisting of isophthalic dicarboxylic acid and naphthalene dicarboxylic acid.

3. Film according to claim 1 in which the resin is a polyethylene terephthalate in which the recurring units derive least 70% in moles of ethylene glycol and from 10 to 30% in moles of diethylene glycol, and in which the total of recurring units deriving from ethylene glycol diethylene glycol is at least 90% in moles.

4. Film according to claim 1 wherein the dianhydride is pyromellitic dianhydride employed in a quantity from 0.01 to 2% by weight.

5. Film according to claim 1 wherein the resin contains up to 5% by weight of a poly(oxybenzoyl-co-oxynaphtoyl) copolymer in which the ratio between the oxbenzoyl and oxynaphtoyl units is 7:3.

6. Film according to claim 1 wherein the polyester resin is added with 1–20% by weight of a polyamide.

7. Film according to claim 1 having a thickness of at least 2.5 $\mu$m to less than 5 $\mu$m.

8. Bioriented film obtained according to the claim 1.

9. Film according to claim 1 having melt strenth values of at least 3 cN.

10. Film according to claim 2 wherein the dianhydride is pyromellitic dianhydride employed in a quantity from 0.01 to 2% by weight.

11. Film according to claim 3 wherein the dianhydride is pyromellitic dianhydride employed in a quantity from 0.01 to 2% by weight.

12. Film according to claim 2 wherein the resin contains up to 5% by weight of a poly(oxybenzoyl-co-oxynaphtoyl) copolymer in which the ratio between the oxybenzoyl and oxynaphtoyl units is 7:3.

13. Film according to claim 3 wherein the resin contains up to 5% by weight of a poly(oxybenzoyl-co-oxynaphtoyl) copolymer in which the ratio between the oxybenzoyl and oxynaphtoyl units is 7:3.

14. Film according to claim 4 wherein the resin contains up to 5% by weight of a poly(oxybenzoyl-co-oxynaphtoyl) copolymer in which the ratio between the oxybenzoyl and oxynaphtoyl units is 7:3.

15. Film according to claim 2 wherein the polyester resin is added with 1–20% by weight of a polyamide.

16. Film according to claim 3 wherein the polyester resin is added with 1–20% by weight of a polyamide.

17. Film according to claim 4 wherein the polyester resin is added with 1–20% by weight of a polyamide.

* * * * *